(No Model.)
W. H. GRANT.
VEHICLE BRAKE.
No. 472,575. Patented Apr. 12, 1892.
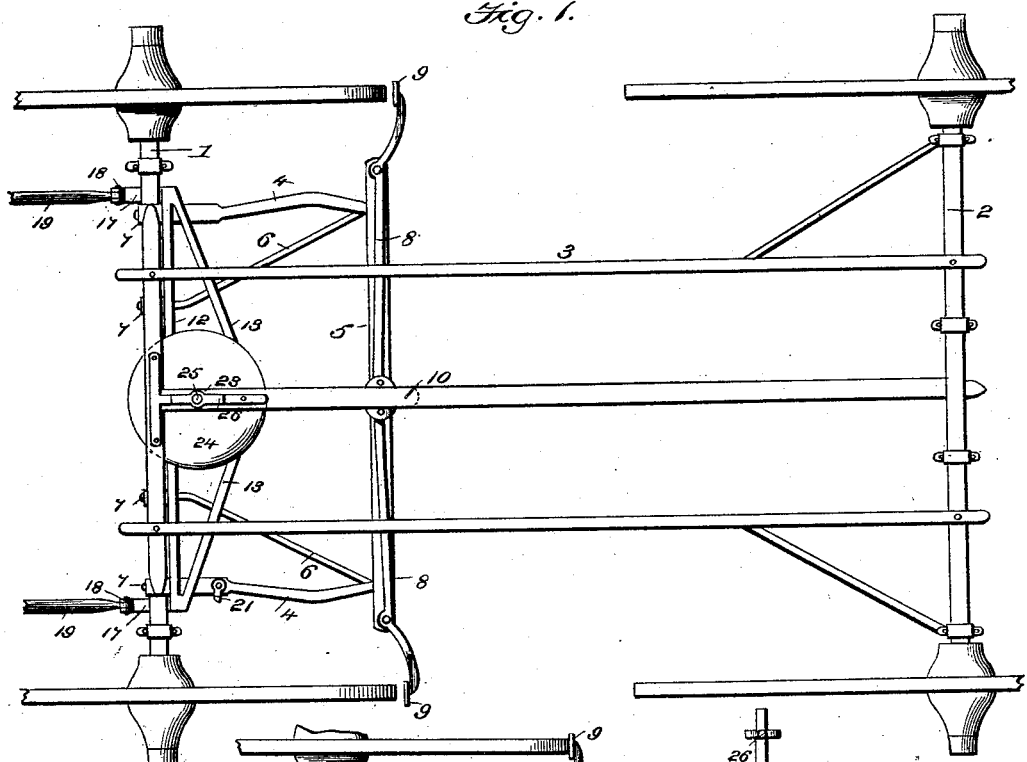
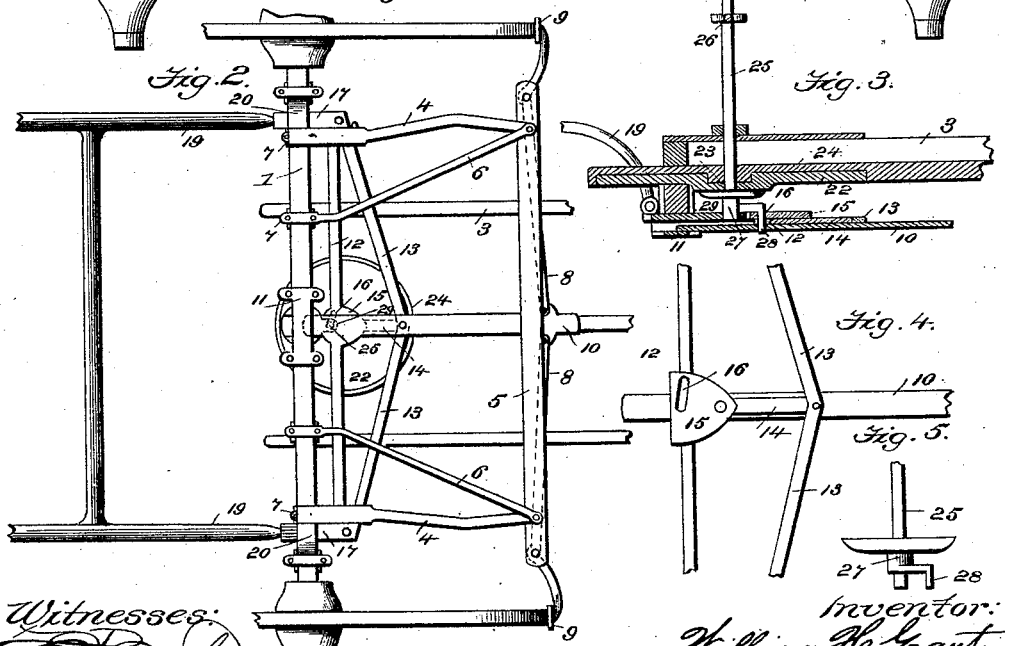
Witnesses:
Inventor:
William H. Grant,
By Wm. N. Moor,
Attorney.

UNITED STATES PATENT OFFICE.

WILLIAM H. GRANT, OF WALTHAM, MAINE.

VEHICLE-BRAKE.

SPECIFICATION forming part of Letters Patent No. 472,575, dated April 12, 1892.

Application filed October 31, 1891. Serial No. 410,420. (No model.)

*To all whom it may concern:*

Be it known that I, WILLIAM H. GRANT, a citizen of the United States, residing at Waltham, in the county of Hancock and State of Maine, have invented certain new and useful Improvements in Vehicle-Brakes; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in vehicle-brakes; and the object of my invention is the provision of a brake adapted to be operated by the horse or by manual power and which will be effective in operation, strong and durable, and inexpensive of production.

To attain the desired object my invention consists in certain improvements in the construction of vehicles, substantially as herein illustrated, described, and specifically defined by the claims.

In order that the construction and advantages gained by my improvements may be readily understood, I have illustrated a vehicle-brake constructed in accordance with and embodying my invention in the accompanying drawings, in which—

Figure 1 represents a top plan view of my invention in the position the parts assume when the animal is drawing the vehicle. Fig. 2 represents a bottom plan view thereof with the parts in the position they assume when the animal is held back and the braking mechanism applied. Fig. 3 represents an enlarged sectional detail view to more clearly show certain parts. Figs. 4 and 5 represent detail views.

Referring by numerals to the drawings, in which corresponding numerals designate similar parts in all the views, 1 designates the front axle.

2 designates the rear axle, and 3 designates the running-gear, which consists of the parallel bars connected at their rear to the rear axle and at their front connected by the transverse bar.

Secured to the front axle are the bars 4, to the inner extremities of which is connected the transverse rail 5, and the said rail and bars are securely braced by the brace-rod 6, the whole structure forming a durable frame, which is connected to the front axle by clips 7. On the transverse rail 5 are pivoted the brake-levers 8, carrying at their outer ends the brake-blocks 9 and at their inner extremities pivoted to the longitudinal bar or plate 10. The inner end of said bar 10 enters the guide-plate 11, secured to the under side of the axle. By this construction it will be seen that when the longitudinal bar 10 is moved inward or outward it operates on the brake-levers to cause the brake-blocks thereof to engage or disengage the wheel. Connected or secured to said longitudinal bar 10 is a frame, consisting of the transverse bar 12, connected to the bar 10 near the inner end thereof, the inclined brace-bars 13, connected to the transverse and longitudinal bars, and a short bar 14, connecting the inclined brace-bars with the transverse bar, and at the point of intersection between the same is formed with or secured to a plate 15, provided with a slot 16, the purpose of which will presently appear. To the outer ends of the transverse bar 12 are secured the links or arms 17, formed with the ears 18, to which the shafts 19 are coupled, as shown, and the plates or links 17 move in guides 20, secured to the under side of the axle. From this construction it will be seen that when the animal is drawing the vehicle the brake-blocks are held out of contact with the wheels; but when the animal is held back the brake-blocks are brought against the wheels and the rotation of the same checked, and to limit the inward movement of the parts I employ the stop-block 21, as will be readily understood.

To the upper side of the axle is secured the disk 22, having a central perforation 23, and to the under side of the running-gear, at the forward end thereof, is secured the disk 24, having the central hub, which fits in the central perforation 23 of the cup-disk 22. Passing through the disks is the rod 25, having at the upper end the cross-piece 26, adapted to serve as a handle for turning the rod, and at the lower end the rod is formed with a hub or enlargement 27 and a crank 28, and at the extreme end is mounted in the extension 29.

The crank 28 rests at all times in the slot 16 of the plate 15, and, as is evident, when said rod is turned the crank thereon acts upon the plate in the same manner as the movement of the shaft back and forth and effects the braking of the wheels or the release thereof, as may be desired, by the hand or foot. From this construction it will be seen that the brake may be applied automatically or by manual power; also, that the parts of my invention are of simple and durable construction, rendering the vehicle thoroughly efficient, and can be manufactured at a comparatively low price.

From the foregoing description and drawings the operation of my invention will be readily understood and its advantages appreciated by all conversant with such matters, and further comment is unnecessary.

I claim as my invention—

1. A vehicle consisting of the front and rear axles, the running-gear mounted thereon, the frame carried by the front axle, the brake-levers pivoted to said frame near their outer ends and carrying the brake-blocks, the longitudinal bar pivoted to the inner ends of the brake-levers, the transverse frame connected to said bar, the links carried by the transverse frame, the rod having its lower end engaging the frame for moving the same, and the shafts connected to said links, substantially as described.

2. A vehicle consisting of the front and rear axle, the running-gear mounted thereon, the frame connected to the front axle, the brake-levers pivoted to said frame and having the brake-blocks, the transverse frame connected to said brake-levers, the flat and cup disks having the central perforation and hub, and the rod passing through said disks and having a crank for operating on said transverse frame, substantially in the manner and for the purpose described.

3. A vehicle consisting of a front and rear axle and running-gear, a frame secured to said front axle, brake-levers pivoted to said frame and having brake-blocks at their outer ends, a longitudinal bar having its inner end pivoted to the inner ends of the brake-levers, the rod connected to said bars, the disk and cup, the guide in which the front end of said bar moves, the transverse frame connected to said longitudinal bar, and the shaft movably connected to said frame, substantially as described.

4. A vehicle consisting of the front and rear axle and the running-gear mounted thereon, the frame connected to the front axle, the brake-levers pivoted to said frame and carrying the brake-blocks, the longitudinal bar pivotally connected to the inner ends of the brake-levers, the guide in which the inner end of said bar moves, the transverse frame connected to the longitudinal bar, the stop for limiting the inward movement of said frame, the links connected to the outer ends of said transverse frame and having ears, the shafts connected to said ears, and the guides for said links, substantially as described.

5. A vehicle consisting of the front and rear axle, the wheels, and the running-gear, the frame connected to the front axle, the brake-levers pivoted to said frame and carrying the brake-blocks, the transverse frame connected to said brake-levers and having the plate provided with a slot, the disks mounted on the axle and having a central perforation, and the rod passing through said disks, having the lower end journaled in the arm secured to the under side of the axle and having the crank engaging the slot of the plate carried by the transverse frame, all arranged and adapted to operate in the manner described.

In testimony whereof I affix my signature in presence of two witnesses.

WILLIAM H. GRANT.

Witnesses:
  FRANK B. GRANT,
  SETH T. CAMPBELL.